United States Patent
Kawata

(10) Patent No.: US 8,037,785 B2
(45) Date of Patent: Oct. 18, 2011

(54) INDEX APPARATUS FOR NC MACHINE TOOL

(75) Inventor: Yasuyuki Kawata, Kyoto (JP)

(73) Assignee: Kawata Chuck Manufacturing Co., Ltd., Kyoto (JP)

( * ) Notice: Subject to any disclaimer, the term of this patent is extended or adjusted under 35 U.S.C. 154(b) by 200 days.

(21) Appl. No.: 12/308,545

(22) PCT Filed: Jun. 18, 2007

(86) PCT No.: PCT/JP2007/062219
§ 371 (c)(1),
(2), (4) Date: Dec. 17, 2008

(87) PCT Pub. No.: WO2007/148647
PCT Pub. Date: Dec. 27, 2007

(65) Prior Publication Data
US 2009/0308200 A1    Dec. 17, 2009

(30) Foreign Application Priority Data
Jun. 20, 2006    (JP) .................................. 2006-169807

(51) Int. Cl.
B23Q 16/00    (2006.01)
(52) U.S. Cl. .................................................... 74/813 L
(58) Field of Classification Search ............... 74/813 L, 74/813 R, 814, 815, 816
See application file for complete search history.

(56) References Cited

U.S. PATENT DOCUMENTS

| | | | | |
|---|---|---|---|---|
| 2,618,982 A | * | 11/1952 | Mead | 74/128 |
| 3,724,291 A | * | 4/1973 | Goebel | 74/815 |
| 4,884,474 A | * | 12/1989 | Kawata | 74/813 L |
| 4,991,463 A | * | 2/1991 | Kawata | 74/817 |
| 6,455,798 B2 | * | 9/2002 | Kawata | 219/69.2 |

FOREIGN PATENT DOCUMENTS

| | | | |
|---|---|---|---|
| EP | 0256628 | | 2/1988 |
| EP | 1136175 A2 | | 9/2001 |
| JP | 53132876 A | * | 11/1978 |
| JP | S56-24540 | | 3/1981 |
| JP | 08-294846 | | 11/1996 |
| JP | 2001-259969 | | 9/2001 |

* cited by examiner

*Primary Examiner* — Vicky Johnson
(74) *Attorney, Agent, or Firm* — Kirschstein, et al.

(57) ABSTRACT

A push-bar indexing device that, when an index table is rotated by a specific angle, the table is accurately stopped to accurately index a workpiece. Each time a push bar is moved, a stopper is moved to a predetermined position by excessive relative movement between a spindle and a main table. An engagement member is operatively associated with the index table, which causes the engagement member to be rotated by a specific angle each time the index table is rotated. This allows the engagement member to be engaged with the stopper of a predetermined position, causing the index table to be stopped by the stopper.

5 Claims, 16 Drawing Sheets

US 8,037,785 B2

INDEX APPARATUS FOR NC MACHINE TOOL

FIELD OF THE INVENTION

The apparatus relates to an index apparatus for an NC machine tool.

BACKGROUND

An index apparatus for an NC machine tool is disclosed in U.S. Pat. Nos. 4,991,463 and 6,455,798 to the inventor of the application.

In the apparatus of U.S. Pat. No. 4,991,463, the NC machine tool includes a spindle, a main table and an NC device for making a machining relative movement between the spindle and the main table. The apparatus includes a housing mounted on the main table. The apparatus further includes an index table on which a work is held, the index table being supported on the housing for rotation. The apparatus is a push bar type which includes a push bar extending into the housing and outwardly of the housing for longitudinal movement. The NC device is arranged to make an extra relative movement between the spindle and the main table other than the machining relative movement, so that the push bar can be pushed and moved longitudinally thereof by the extra relative movement. Transmission means is received in the housing and disposed between the push bar and the index table to rotate the index table at an angle in response to the movement of the push bar whenever the push bar is moved, so as to index the work.

However, the apparatus cannot always stop the index table exactly, after rotating the index table at the angle. The index table may be rotated by momentum. Accordingly, the apparatus cannot always index the work exactly.

In the apparatus of U.S. Pat. No. 6,455,798, an additional push bar extends into the housing and outwardly of the housing in addition to the push bar, the push bar or the additional push bar being pushed and moved longitudinally thereof by the extra relative movement. Transmission means is received in the housing and disposed between the push bar, the additional push bar and the index table to rotate the index table in one direction in response to the movement of the push bar and in the reverse direction in response the movement of the additional push bar, so as to index the work.

However, the index apparatus also cannot always stop the index table exactly, after rotating the index table at the angle. The index table may be rotated by momentum.

It is therefore an object of the invention to provide a new push bar type of index apparatus which can stop the index table exactly, after rotating the index table at an angle, to index a work exactly.

DISCLOSURE OF THE INVENTION

The invention relates to an index apparatus for an NC machine tool. The NC machine tool includes a spindle, a main table and an NC device for making machining relative arrangement between the spindle and the main table. The apparatus includes a housing mounted on the main table. An index table is supported on the housing for rotation. A push bar extends into the housing and outwardly of the housing for movement. The NC device is arranged to make an extra relative movement between the spindle and the main table other than the machining relative movement, so that the push bar can be pushed and moved longitudinally thereof by the extra relative movement. Transmission means is received in the housing and disposed between the push bar and the index table to rotate the index table at an angle in response to the movement of the push bar whenever the push bar is moved.

In addition, according to the invention, a stop is moved to a position by the extra relative movement whenever the push bar is moved. Engagement means is rotated at an angle in response to the rotation of the index table whenever the index table is rotated, to be engaged with the stop moved to the position, so that the index table can be stopped by the stop.

In a preferred embodiment, the stop comprises a movable bar moved longitudinally thereof. The engagement means is engaged with the movable bar moved to the position.

In another embodiment, the stop comprises a movable pawl moved about a support. The engagement means is engaged with the movable pawl moved to the position.

In another embodiment, the stop comprises a movable bar provided with an auxiliary pawl. The movable bar is moved longitudinally thereof and integrally with the auxiliary pawl. The engagement means is engaged with the auxiliary pawl moved to the position.

The stop may be connected to and supported by the push bar.

The stop may be supported by the housing for movement.

The engagement means may comprise a plurality of pins, projections or teeth. The index table includes a rotational shaft. The pins, projections or teeth are spaced equiangularly about the rotational shaft and fixed to the rotational shaft to be rotated integrally with the index table so that one of the pins, projections or teeth can pass through the position of stop whenever the index table is rotated. Next pin, projection or tooth is then engaged with the stop moved to the position.

BEST MODE TO CARRY OUT THE INVENTION

Figure 1:
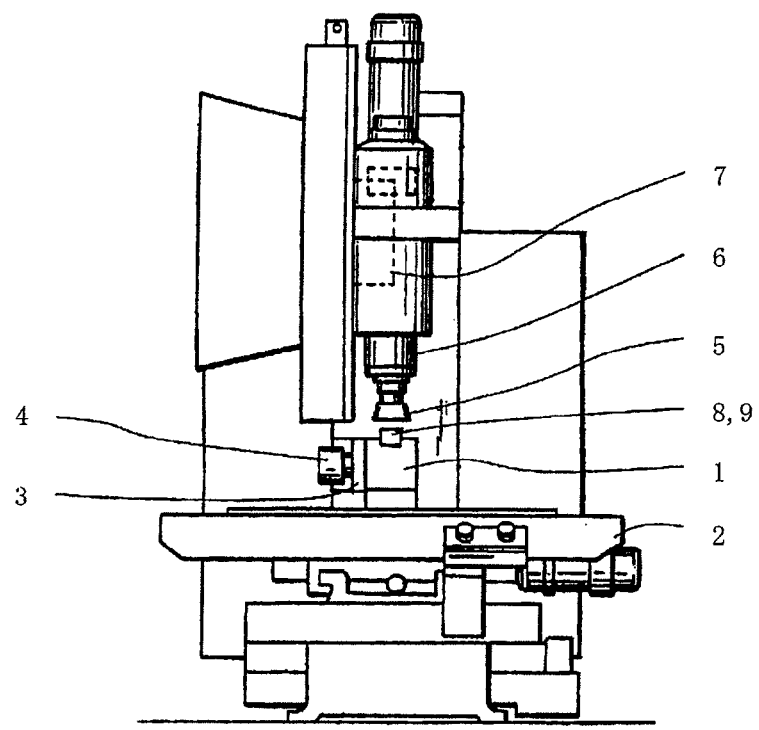
FIG. 1 is a side view of a preferred embodiment of the invention

Turning now to drawings, FIG. 1 illustrates an index apparatus for an NC machine tool, according to the invention. The apparatus includes a housing 1 mounted on a main table 2, as in the case of U.S. Pat. No. 4,991,463. The apparatus further includes an index table 3 on which a work 4 is held, the index table 3 being supported on the housing 1 for rotation. A tool 5 such as face cutter is mounted and held on a spindle 6. The machine tool further includes an NC device 7 for making a machining relative movement between the spindle 6 and the main table 2 so that the work 4 can be machined with the tool 5.

Figure 2:
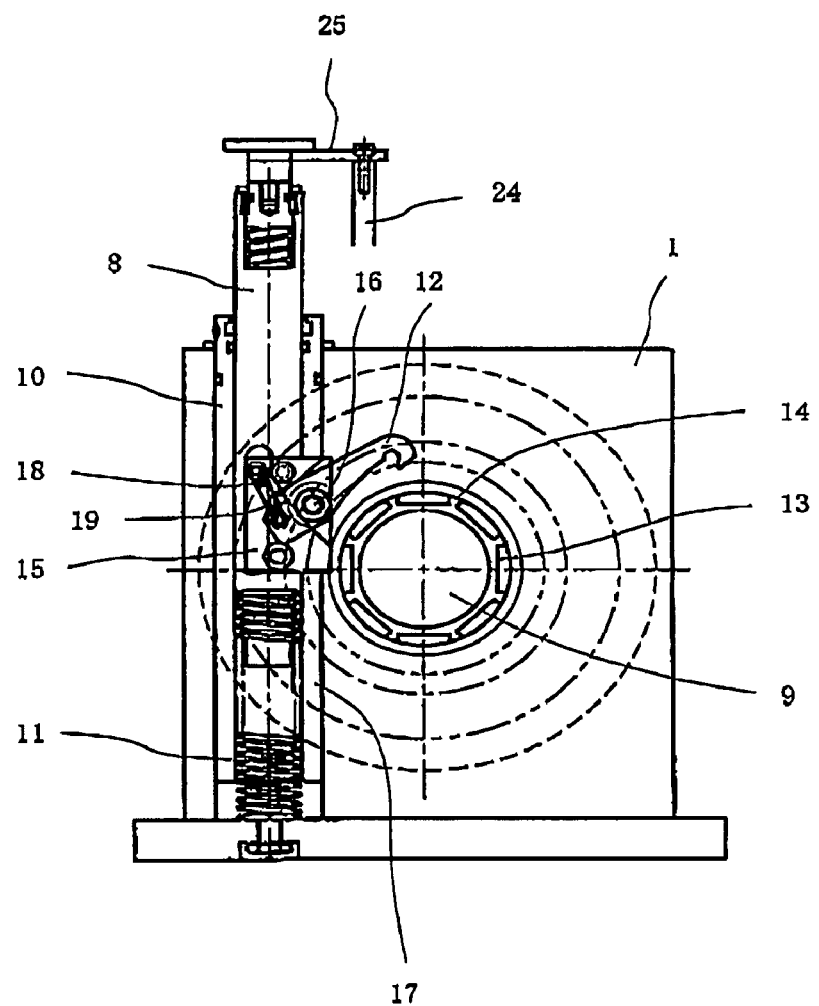
FIG. 2 is a cross sectional view of the apparatus of FIG. 1.

In addition, the apparatus includes a push bar 8 extending into the housing 1 and outwardly of the housing 1 for movement, as shown in FIG. 2. The NC device 7 is arranged to make an extra relative movement between the spindle 6 and the main table 2 so that the push bar 8 can be pushed and moved longitudinally thereof by the extra relative movement. The apparatus further includes transmission means received in the housing 1 and disposed between the push bar 8 and the index table 3 to rotate the index table 3 at an angle in response to the movement of the push bar 8 whenever the push bar 8 is moved, as also in the case of the U.S. patent.

The index table 3 includes a rotational shaft 9 extending horizontally and into the housing 1. The push bar 8 extends vertically on one side of the rotational shaft 9 to be fitted into a sleeve 10 for movement, the sleeve 10 being disposed in the housing 1. The apparatus further includes a spring 11 for resiliently urging the push bar 8 upwardly. The transmission means includes a feed pawl 12 mounted on the push bar 8. The transmission means further includes a ratchet wheel 13 having teeth 14 and disposed coaxially with the index table 3 and fixed to the shaft 9. The feed pawl 12 is engaged with the tooth 14 of the ratchet wheel 13 to rotate the ratchet wheel 13 and the index table 3 at an angle in response to the movement of the push bar 8.

The push bar 8 includes a bracket 15 fixed thereto and having a pin 16. The feed pawl 12 is supported on the pin 16 for movement thereabout. The sleeve 10 includes a slot 17 formed therein and extending axially of the sleeve 10, the feed pawl 12 and the bracket 15 being inserted into the slot 17. The feed pawl 12 extends over the ratchet wheel 13 to be opposed to the tooth 14. In addition, the bracket 15 is provided with a spring 18 to resiliently urge the feed pawl 12 about the pin 16 clockwise in FIG. 2. A stop 19 is formed on the feed pawl 12 to be engaged with a shoulder formed on the bracket 15 so that the feed pawl 12 can be held at a position.

Figure 4:
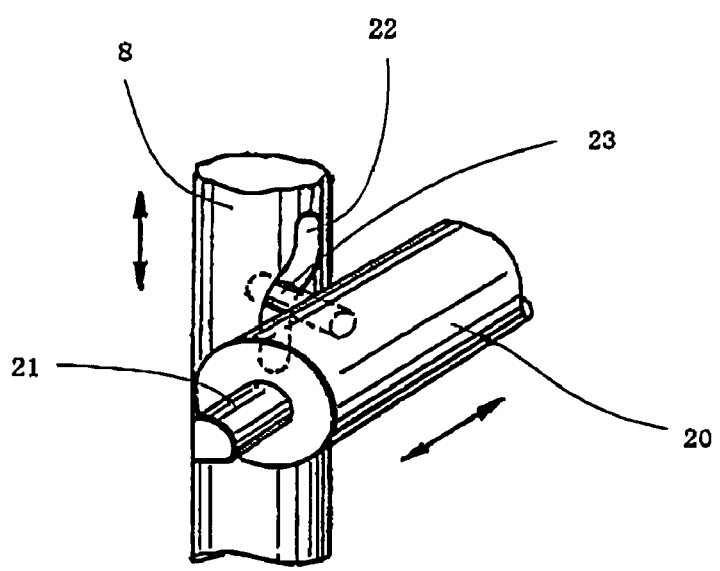
FIG. 4 is a perspective view of the locking member for locking the index table from rotation of FIG. 1.

The apparatus further includes a locking member 20 comprising a rod and having a tooth-shaped portion 21 which is engaged with a gear mounted on and fixed to the index table 3 for locking the index table 3 from rotation, as shown in FIG. 4 and disclosed in the U.S. patent. The apparatus further includes unlocking means comprising a cam groove 22 formed in the push bar 8. The locking member 20 is provided with a pin 23 inserted into the cam groove 22. The cam groove 22 extends axially of the push bar 8 to be inclined obliquely so that the locking member 20 can be moved axially thereof by the cam groove 22 and the pin 23, to unlock the index table 3, as described latter.

Furthermore, the apparatus includes a stop moved to a position by the extra relative movement between the spindle 6 and the main table 2 whenever the push bar 3 is moved. Engagement means is rotated at an angle in response to the rotation of the index table 3 whenever the index table 3 is rotated, to be engaged with the stop moved to the position, so that the index table 3 can be stopped by the stop.

Figure 5:
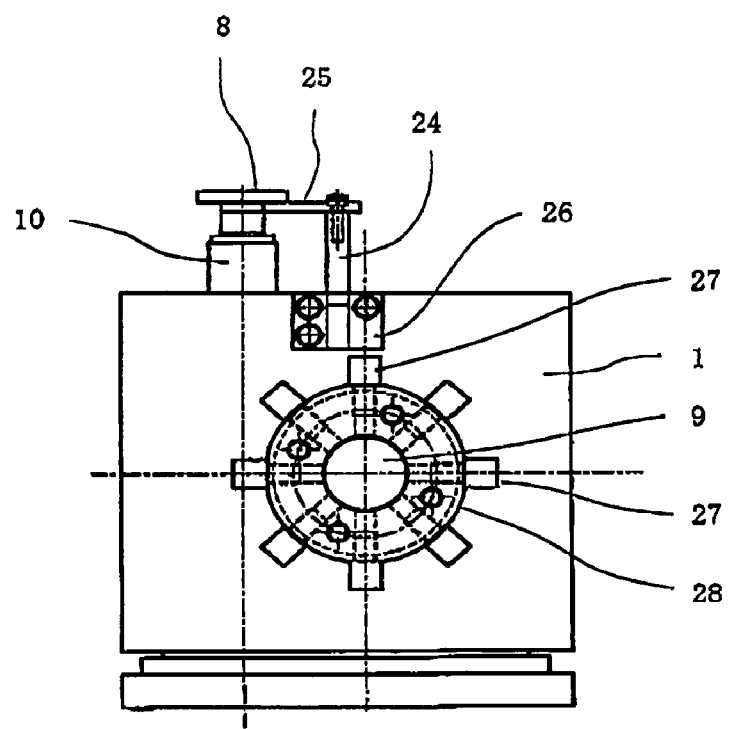
FIG. 5 is an elevational view of the apparatus of FIG. 1.
Figure 6:
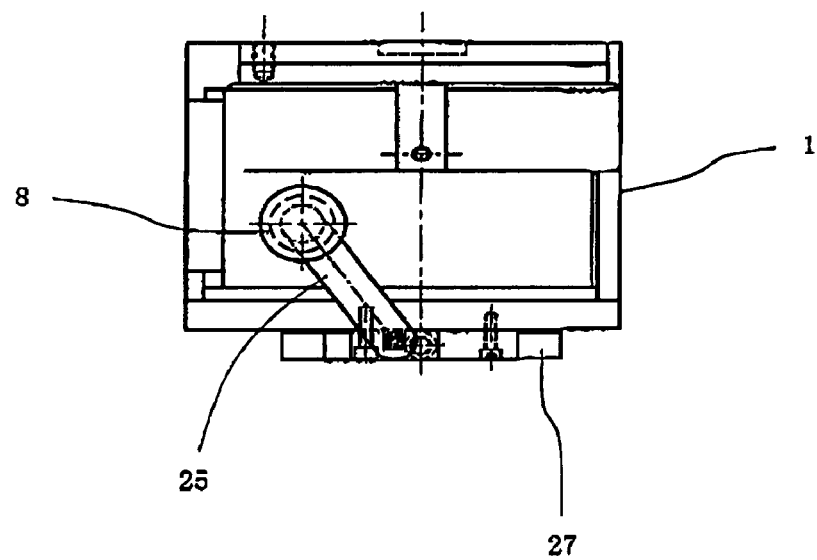
FIG. 6 is a plan view of the apparatus of FIG. 5.
Figure 7:
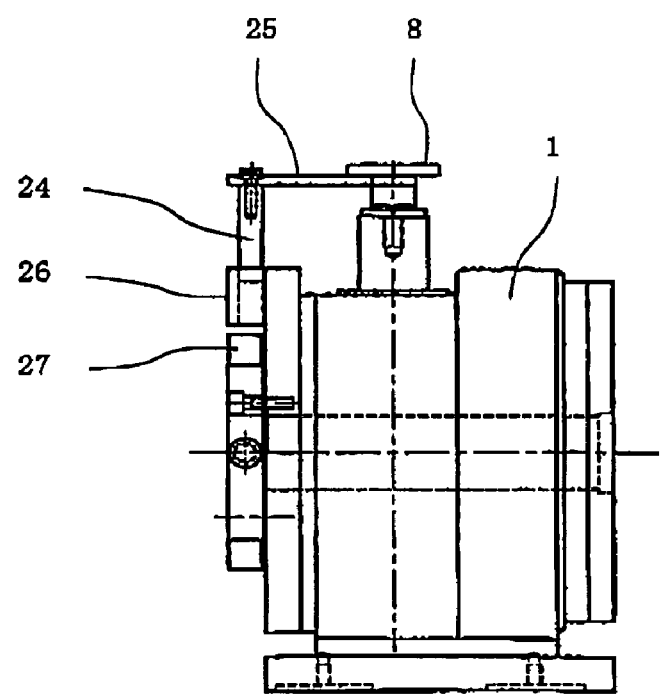
FIG. 7 is a side view of the apparatus of FIG. 5.

In the embodiment, the stop comprises a movable bar 24 extending parallel to the push bar 8 and connected to and supported by a connecting plate 25 and the push bar 8, as shown in FIGS. 5, 6 and 7. The housing 1 is provided with a guide plate 26 mounted on the outer surface thereof on the opposite side to the index table 3. The movable bar 24 is inserted between the guide plate 26 and the housing 1 for movement. The movable bar 24 is therefore moved integrally with the push bar 8 and the connecting plate 25 when the push bar 8 is moved longitudinally thereof by the extra relative movement between the spindle 6 and the main table 2. It should therefore be understood that the movable bar 24 is moved to the position by the extra relative movement whenever the push bar 8 is moved. The movable bar 24 is moved longitudinally thereof.

The engagement means comprises a plurality of pins 27. The pins 27 are spaced equiangularly about the rotational shaft 9 of the index table 3. A rotational plate 28 is mounted on the rotational shaft 9. The pins 27 are mounted on and fixed to the rotational plate 28 and the rotational shaft 9 to be rotated integrally with the rotational plate 28, the rotational shaft 9 and the index table 3. The pins 27 are therefore rotated at an angle in response to the rotation of the index table 3 whenever the index table 3 is rotated, to be engaged with the movable bar 24 moved to the position, as described latter.

In operation, the NC device 7 makes the extra relative movement between the spindle 6 and the main table 2 other than the machining relative movement, so that the push bar 8 can be pushed and moved longitudinally thereof by the extra relative movement, as described above. In the embodiment, the spindle 6 and the tool 5 are moved downwardly by the extra relative movement to be engaged with the push bar 8. The push bar 8 can therefore be pushed and moved downwardly by the tool 5. The locking member 20 is then moved axially thereof by the cam groove 22 and the pin 23 when the push bar 8 is moved to a position. The tooth-shaped portion 21 is therefore disengaged from the gear of the index table 3 to unlock the index table 3 for rotation.

Figure 3:
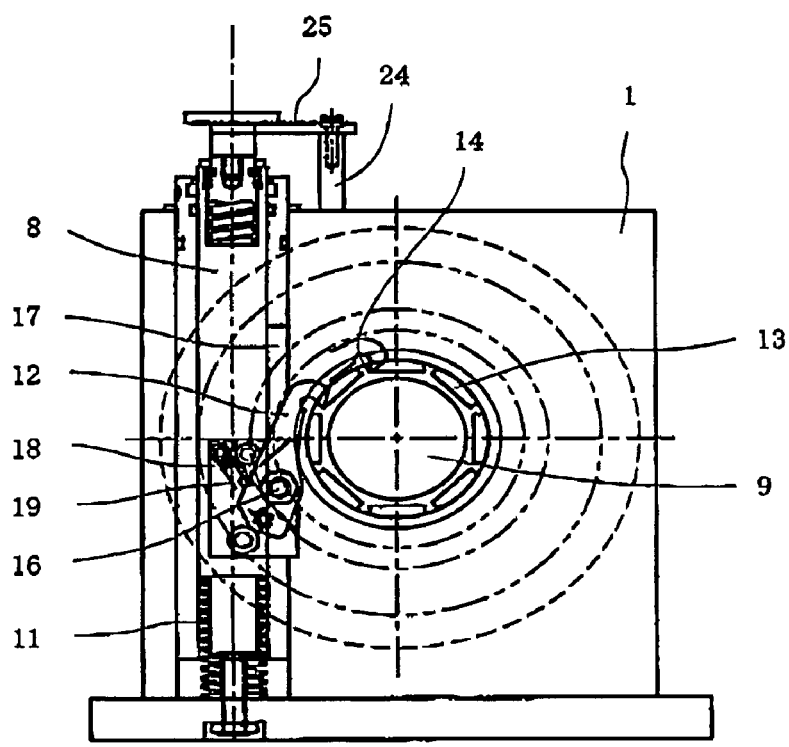
FIG. 3 is a cross sectional view of the push bar and the movable bar moved downwardly of FIG. 2.

The push bar 8 is further moved downwardly so that the feed pawl 12 is engaged with one of the teeth 14 of the ratchet wheel 13, as shown in FIG. 3. The tooth 14 is therefore pulled downwardly by the feed pawl 12 which is moved about the pin 16 counterclockwise in FIG. 3, to rotate the ratchet wheel 13, the rotational shaft 9 and the index table 3. The spindle 6 and the tool 5 are then moved upwardly from the push bar 8. The push bar 8 is therefore moved upwardly to be returned by the spring 11 so that the feed pawl 12 can be disengaged from the tooth 14 of the ratchet wheel 13. The feed pawl 12 is pulled and moved about the pin 16 clockwise in FIG. 3 by the spring 18 to be returned.

The push bar 8 is moved downwardly and upwardly by the tool 5 and the spring 11, to rotate the index table 3, again and again. The apparatus can therefore rotate the index table 3 at an angle in response to the movement of the push bar 8 whenever the push bar 8 is moved, to index the work 4.

Figure 8:
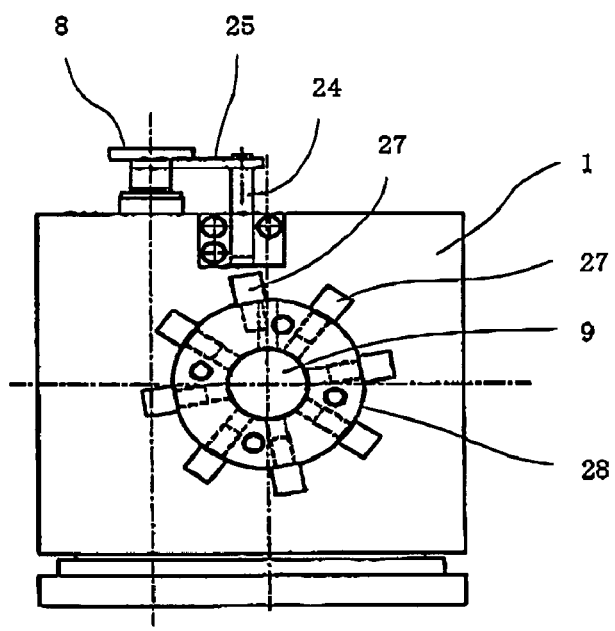
FIG. 8 is a side view of the movable bar moved downwardly and the pins rotated of FIG. 5.
Figure 9:
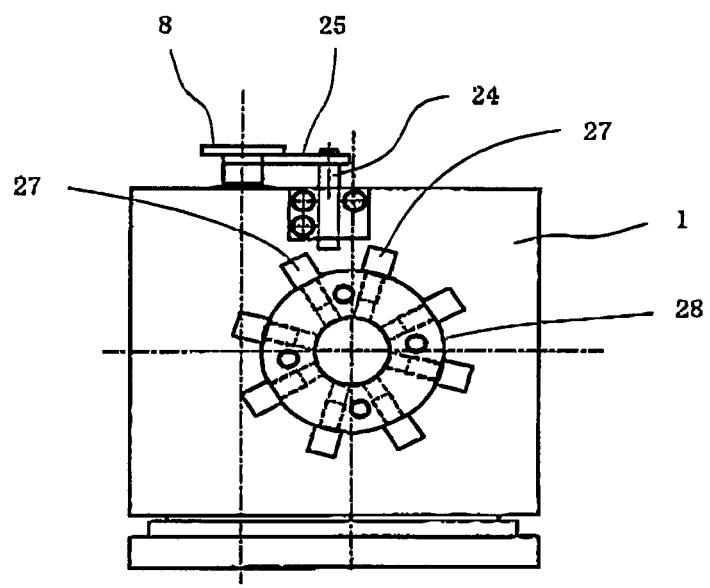
FIG. 9 is a side view of the movable bar and the pins at a step next to that of FIG. 8.
Figure 10:
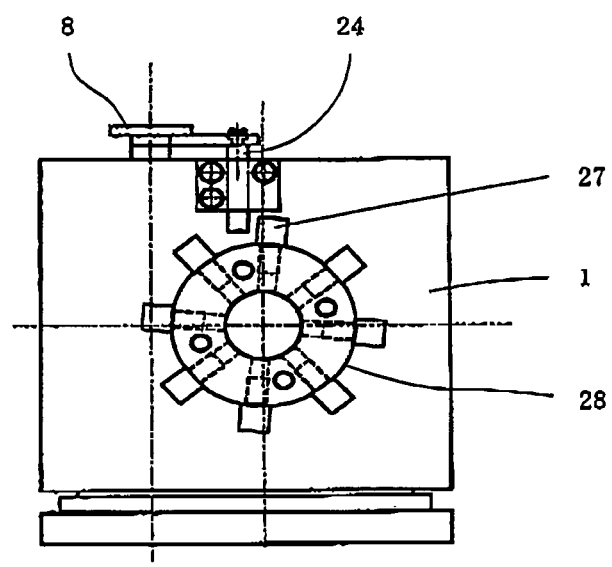
FIG. 10 is a side view of the movable bar and the pins at a step next to that of FIG. 9.
Figure 11:
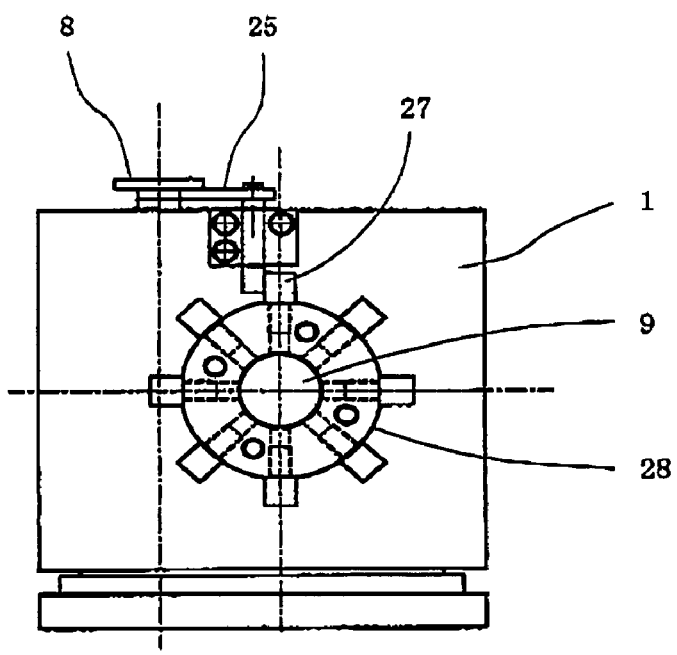
FIG. 11 is a side view of the movable bar and the pins at a step next to that of FIG. 10.

In the apparatus, the movable bar 24 is moved longitudinally thereof, downwardly and integrally with the push bar 8 when the push bar 8 is moved downwardly and the index table 3 is rotated. The pins 27 are rotated integrally with the index table 3. In this connection, one of the pins 27 passes through the position of movable bar 24, as shown in FIGS. 8 and 9, whenever the index table 3 is rotated. The movable bar 24 is then moved downwardly, between one of the pins 27 and the next pin 27 and to the position shown in FIG. 10. The next pin 27 is therefore engaged with the movable bar 24 moved to the position after rotating the index table 3 at an angle, so that the pins 27, the rotational shaft 9 and index table 3 can be stopped by the movable bar 24, as shown in FIG. 11.

The movable bar 24 is then moved upwardly to be returned when the push bar 8 is moved upwardly. The movable bar 24 is then moved downwardly again while the pins 27 are rotated again when the push bar 8 is moved downwardly and the index table 3 is rotated. In addition, one of the pins 27 passes through the position of movable bar 24. The movable bar 24 is then moved downwardly and to the position. The next pin 27 is therefore engaged with the movable bar 24 moved to the position, so that the index table 3 can be stopped by the movable bar 24.

The apparatus can therefore stop the index table 3 exactly, after rotating the index table 3 at an angle. The index table cannot be rotated by momentum. Accordingly, the apparatus can index the work 4 exactly.

As to the work 4 held on the index table 3 and the tool 5 mounted on the spindle 6 in the embodiment, a tool may be held on the index table 3 while a work is mounted on the spindle 6, so that the work can be machined with the tool. In this case, the apparatus can rotate the index table 3 at an angle to index the tool.

The apparatus may include engagement means other than the pins 27. The engagement means should be rotated at an angle by the extra relative movement in response to the rotation of the index table 3 whenever the index table 3 is rotated, to be engaged with the stop moved to the position, so that the index table 3 can be stopped by the stop.

Figure 12:
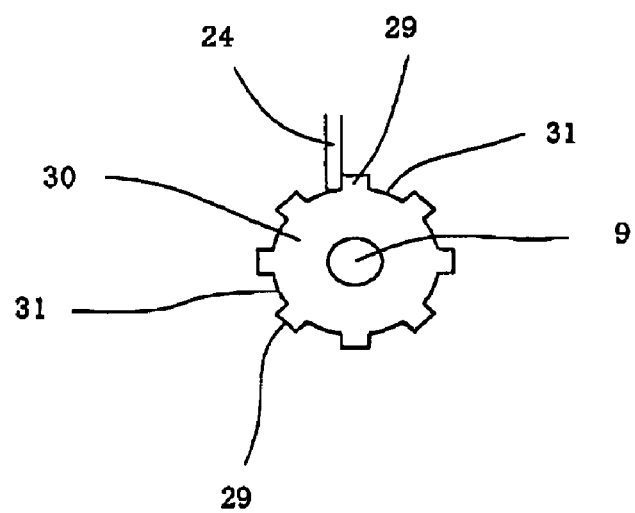
FIG. 12 is an explanatory view of another embodiment.

For example, FIG. 12 illustrates another embodiment in which the engagement means comprises a plurality of projections 29 formed on a rotational plate 30 and between a plurality of grooves 31 which are formed in the rotational plate 30 to be spaced equiangularly along the periphery of the rotational plate 30. The rotational plate 30 is mounted on the rotational shaft 9. It should therefore be understood that the projections 29 are spaced equiangularly about the rotational shaft 9 and mounted on and fixed to the rotational shaft 9. Accordingly, the projections 29 are rotated integrally with the index table 3. The projections 29 are rotated at an angle whenever the index table 3 is rotated, to be engaged with the stop moved to the position, so that the index table 3 can be stopped by the stop.

The ratchet wheel 13 is disposed coaxially with the index table 3 and fixed to the rotational shaft 9, as described above. The ratchet wheel 13 has a plurality of teeth 14. It should therefore be understood that the teeth 14 are spaced equiangularly about the rotational shaft 9 and fixed to the rotational shaft 9. In this connection, FIG. 13 illustrates another embodiment in which the engagement means comprises the teeth 14 which are rotated integrally with the index table 3, the teeth 14 being rotated at an angle whenever the index table 3 is rotated.

Figure 13:
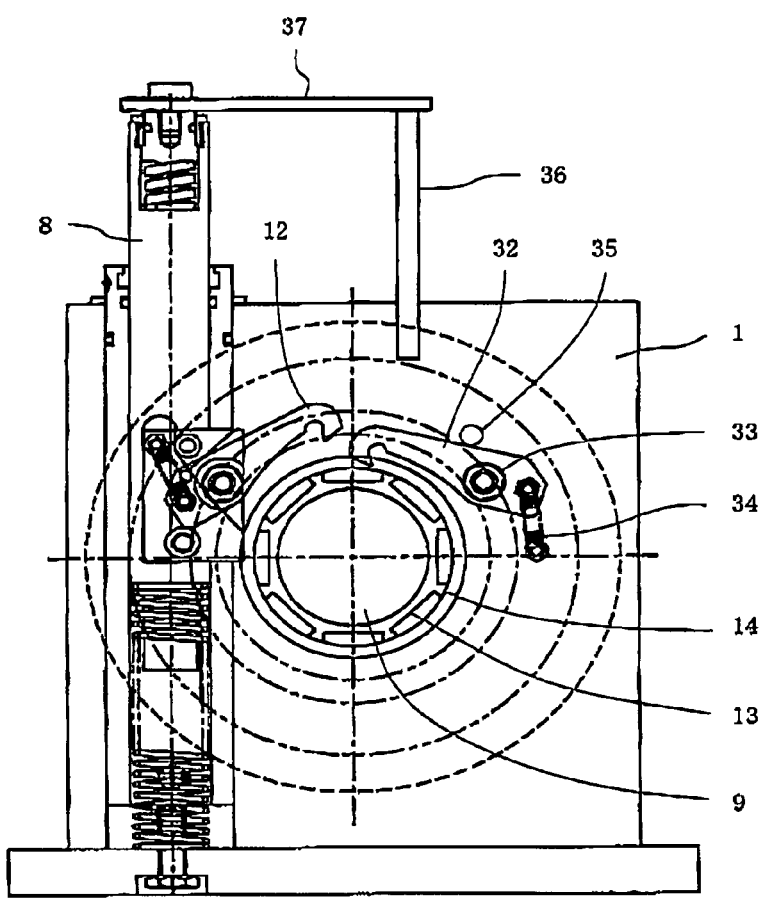
FIG. 13 is a cross sectional view of another embodiment.

In the embodiment of FIG. 13, the stop comprises a movable pawl 32 supported by the housing 1 to be moved about a support. The movable pawl 32 extends inversely to the feed pawl 12 and over the ratchet wheel 13 to be opposed to the teeth 14. The support comprises a pin 33 formed on the housing 1. The movable pawl 32 is supported by the pin 33 to be moved about the pin 33. The housing 1 includes a spring 34 resiliently urging the movable pawl 32 about the pin 33 clockwise in FIG. 13. In addition, the housing 1 is provided with a pin 35 so that the movable pawl 32 can be engaged with the pin 35 to be held at a position.

Figure 14:
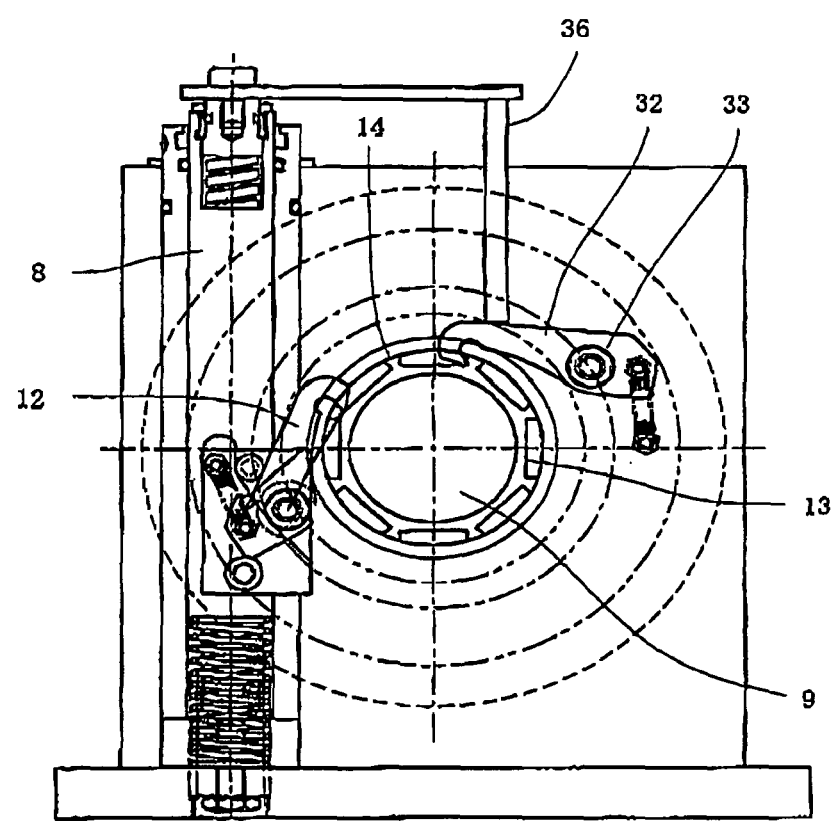
FIG. 14 is a cross sectional view of the movable pawl moved of FIG. 13.

In addition, in the embodiment of FIG. 13, a movable bar 36 extends in parallel to the push bar 8 to be connected to and supported by a connecting plate 37 and the push bar 8. The movable bar 36 is therefore moved integrally with the push bar 8 and the connecting plate 37 when the push bar 8 is moved longitudinally thereof by the relative movement between the spindle 6 and the main table 2. The movable bar 35 is moved to a position corresponding to the movable pawl 32. The movable bar 36 is therefore moved downwardly and toward the movable pawl 32 and engaged with the movable pawl 32 when the push bar 8 is moved downwardly and the index table 3 is moved, as shown in FIG. 14, so that the movable pawl 32 can be pushed and moved downwardly and about the pin 33 counter clockwise in FIG. 13 by the movable bar 36.

The teeth 14 are rotated at an angle whenever the index table 3 is rotated, so that one of the teeth 14 can pass through the position of the movable pawl 32. The movable pawl 32 is then moved about the support, to a position shown in FIG. 14 and between one of the teeth 14 and next tooth 14. The movable pawl 32 is moved toward the ratchet wheel 13 and inserted into a space between the teeth thereof. The next tooth 14 is therefore engaged with the movable pawl 32 moved to the position, so that the ratchet wheel 13, the rotational shaft 9 and the index table 3 can be stopped by the movable pawl 32.

It should therefore understood in the embodiment of FIG. 13 that the movable pawl 32 is moved about the support and to a position by the movable bar 36 whenever the push bar 3 is moved. In addition, the teeth 14 are rotated at an angle in response to the rotation of the index table 3 whenever the index table 3 is rotated, to be engaged with the movable pawl 32 moved to the position, so that the index table 3 can be stopped by the movable pawl 32.

Figure 15:
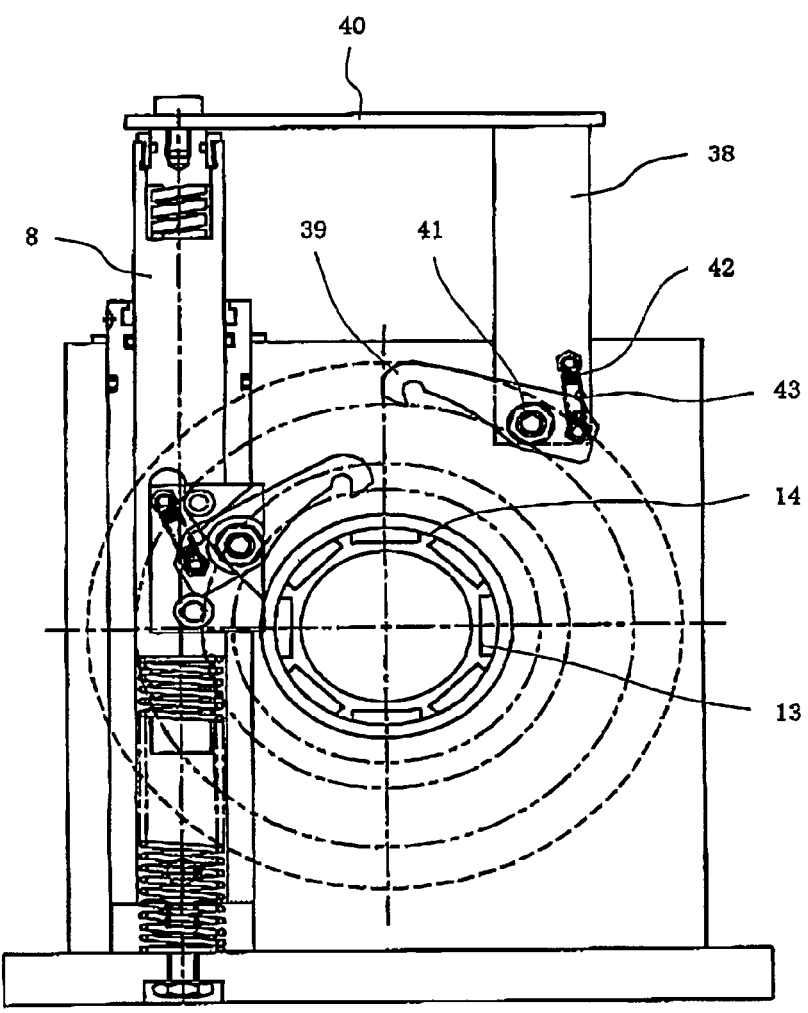
FIG. 15 is a cross sectional view of another embodiment.

FIG. 15 illustrates another embodiment in which the engagement means comprising the teeth 14 of the ratchet wheel 13. The stop comprises a movable bar 38 and an auxiliary pawl 39. The movable bar 38 extends parallel to the push bar 8 to be connected to a connecting plate 40 and the push bar 8. The movable bar 38 includes a pin 41 and the auxiliary pawl 39 which is supported on the pin 41 to be moved thereabout. In addition, the movable bar 38 includes a spring 42 resiliently urging the auxiliary pawl 39 about the pin 41 counterclockwise in FIG. 15. The movable bar 38 further includes a pin 43 with which the auxiliary pawl 39 is engaged to be held at a position.

The auxiliary pawl 39 is therefore moved integrally with the movable bar 38 moved longitudinally thereof. In addition, one of the teeth 14 passes through the position of auxiliary pawl 39. The auxiliary pawl 39 is then moved toward the ratchet wheel 13, between one of the teeth 14 and next tooth 14 and to a position, to be inserted into a space between the teeth 14 of the ratchet wheel 13. The auxiliary pawl 39 is engaged with the bottom of the space and then moved about the pin 41 clockwise in FIG. 15 in response to the longitudinal movement of the movable bar 38, to permit the movable bar 38 to be moved. The next tooth 14 is therefore engaged with the auxiliary pawl 39 moved to the position when rotating the index table 3 at an angle.

Figure 16:
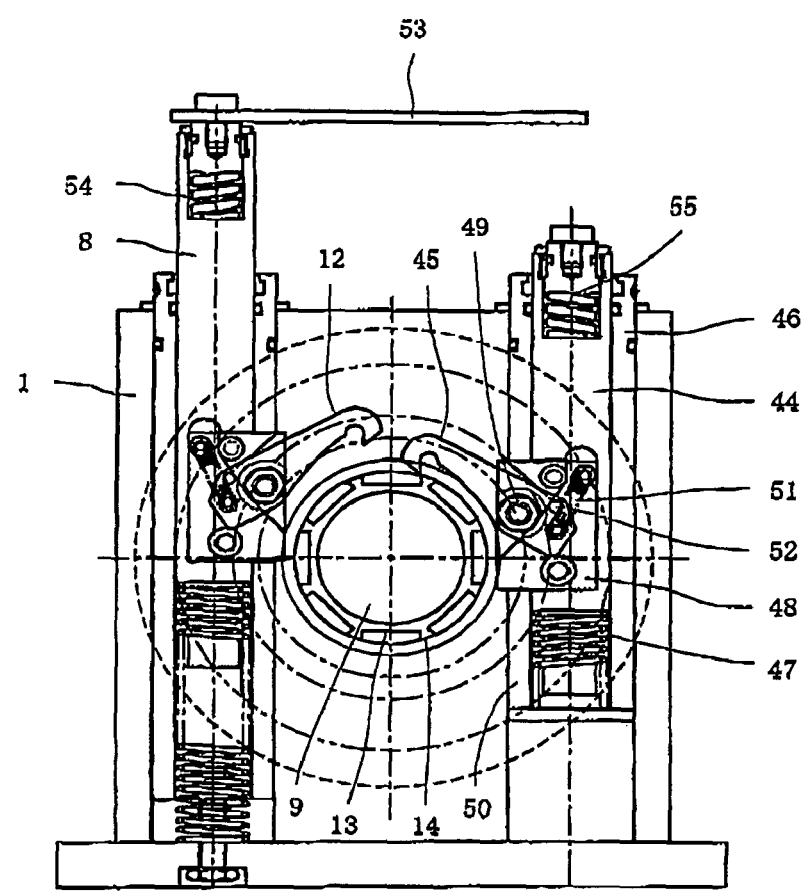
FIG. 16 is a cross sectional view of another embodiment.

FIG. 16 illustrates another embodiment in which the stop comprises a movable bar 44 and an auxiliary pawl 45. The movable bar 44 extends parallel to the push bar 8 to be supported by the housing 1 for movement. The push bar 8 extends vertically on one of the opposite sides of the rotational shaft 9 while the movable bar 44 extends vertically on the other side. The housing 1 includes a sleeve 46 into which the movable bar 44 is fitted for movement, as in the case of the push bar 8. A spring 47 resiliently urges the movable bar 44 upwardly.

A bracket 48 is provided with the auxiliary pawl 45 and a pin 49, the auxiliary pawl 45 being supported on the pin 49 to be moved about the pin 49. The sleeve 46 includes a slot 50 formed therein and extending axially of the sleeve 46. The auxiliary pawl 45 and the bracket 48 are received in the slot 50, the bracket 48 being fixed to the movable bar 44. The auxiliary pawl 45 extends inversely to the feed pawl 12 and over the ratchet wheel 13 to be opposed to the teeth 14. The bracket 48 includes a spring 51 resiliently urging the auxiliary pawl 45 about the pin 49 counterclockwise in FIG. 16. The auxiliary pawl 45 includes a pin 52 engaged with a shoulder formed on the bracket 48 so that the auxiliary pawl 45 can be held at a position.

In addition, a movable member 53 is combined with the movable bar 44 and connected to and supported by the push bar 8. The movable member 53 is moved integrally with the push bar 8 and to a position corresponding to the movable bar 44 when the push bar 8 is moved longitudinally thereof by the extra relative movement between the spindle 6 and the main table 2. The movable member 53 is therefore moved downwardly and toward the movable bar 44 and engaged with the movable bar 44 when the push bar 8 is moved downwardly and the index table 3 is rotated, so that the movable bar 44 can be pushed and moved longitudinally thereof and downwardly by the movable member 53. The auxiliary pawl 45 is moved integrally with the movable bar 44. In addition, one of the teeth 14 passes through the position of auxiliary pawl 45. The auxiliary pawl 45 is then moved toward the ratchet wheel 13, between one of the teeth 14 and next tooth 14 and to a position, to be inserted into a space between the teeth of the ratchet wheel 13. The auxiliary pawl 45 is then moved about the pin 49 clockwise in FIG. 16 in response to the longitudinal movement of the movable bar 44, to permit the movable bar 44 to be moved. The next tooth 14 is therefore engaged with the auxiliary pawl 45 moved to the position, when rotating the index table 3 at an angle.

In the embodiment of FIG. 16, the push bar 8 may be divided into two parts longitudinally thereof so that a spring 54 can be interposed between the two parts to absorb a shock. The movable bar 44 may also be divided into two parts longitudinally thereof so that a spring 55 can be interposed between the two parts to absorb a shock.

It should therefore be understood in the embodiment of FIG. 16 that the auxiliary pawl 45 is moved to a position by the extra relative movement between the spindle 6 and the main table 2 whenever the push bar 8 is moved. In addition, the teeth 14 are rotated at an angle in response to the rotation of the index table 3 whenever the index table 3 is rotated, to be engaged with the auxiliary pawl 45 moved to the position. The index table 3 can therefore be stopped by the auxiliary pawl 45.

In the embodiment of FIG. 16, the NC device may make the extra relative movement between the spindle 6 and the main table 2 so that the push bar 8 can be moved longitudinally thereof by a particular portion other than the tool 5. The movable bar 44 and the auxiliary pawl 45 may be moved by a particular portion other than the tool 5.

In the apparatus of U.S. Pat. No. 6,455,798, the apparatus rotates an index table in one direction in response to the longitudinal movement of a push bar and in the reverse direction in response to the longitudinal movement of an additional push bar, to index a work, as described above. In the apparatus, engagement means may be engaged with a stop moved to a position so that the index table can be stopped by the stop, according to the invention. In this case, the push bar and the additional bar may be disposed not at the same position as each other axially of the index table but at different positions from each other. Much the same is true on the stop and the engagement means.

The invention claimed is:

1. An NC machine tool including a spindle, a main table and an NC device for making a machining relative movement between the spindle and the main table, the NC machine tool comprising:
a housing mounted on the main table;
an index table supported on the housing for rotation;
a push bar extending into the housing and outwardly of the housing for movement;
the NC device being arranged to make an extra relative movement between the spindle and the main table other than the machining relative movement, so that the push bar can be pushed and moved longitudinally thereof by the extra relative movement;
transmission means received in the housing and disposed between the push bar and the index table to rotate the index table at an angle in response to the movement of the push bar whenever the push bar is moved;
a stop connected to and supported by the push bar and moved to a position by the extra relative movement whenever the push bar is moved; and
engagement means rotated at an angle in response to the rotation of the index table whenever the index table is rotated, to be engaged with the stop moved to the position, so that the index table can be stopped by the stop,
wherein the stop comprises a movable bar moved longitudinally thereof, and
wherein the engagement means is engaged with the movable bar moved to the position.

2. An NC machine tool including a spindle, a main table and an NC device for making a machining relative movement between the spindle and the main table, the NC machine tool comprising:
a housing mounted on the main table;
an index table supported on the housing for rotation;
a push bar extending into the housing and outwardly of the housing for movement;
the NC device being arranged to make an extra relative movement between the spindle and the main table other than the machining relative movement, so that the push bar can be pushed and moved longitudinally thereof by the extra relative movement;
transmission means received in the housing and disposed between the push bar and the index table to rotate the index table at an angle in response to the movement of the push bar whenever the push bar is moved;
a stop connected to and supported by the push bar and moved to a position by the extra relative movement whenever the push bar is moved; and
engagement means rotated at an angle in response to the rotation of the index table whenever the index table is rotated, to be engaged with the stop moved to the position, so that the index table can be stopped by the stop,
wherein the stop comprises a movable bar provided with an auxiliary pawl, the movable bar being moved longitudinally thereof and integrally with the auxiliary pawl, and
wherein the engagement means is engaged with the auxiliary pawl moved to the position.

3. An NC machine tool including a spindle, a main table and an NC device for making a machining relative movement between the spindle and the main table, the NC machine tool comprising:
a housing mounted on the main table;
an index table supported on the housing for rotation;
a push bar extending into the housing and outwardly of the housing for movement;
the NC device being arranged to make an extra relative movement between the spindle and the main table other than the machining relative movement, so that the push bar can be pushed and moved longitudinally thereof by the extra relative movement;
transmission means received in the housing and disposed between the push bar and the index table to rotate the index table at an angle in response to the movement of the push bar whenever the push bar is moved;

a stop connected to and supported by the push bar and moved to a position by the extra relative movement whenever the push bar is moved; and engagement means rotated at an angle in response to the rotation of the index table whenever the index table is rotated, to be engaged with the stop moved to the position, so that the index table can be stopped by the stop, wherein the engagement means comprises a plurality of pins, projections or teeth, wherein the index table includes a rotational shaft, and wherein the pins, projections or teeth are spaced equiangularly about the rotational shaft and fixed to the rotational shaft to be rotated integrally with the index table so that one of the pins, projections or teeth can pass through the position of stop whenever the index table is rotated, the next pin, projection or tooth being then engaged with the stop moved to the position.

4. An NC machine tool including a spindle, a main table and an NC device for making a machining relative movement between the spindle and the main table, the NC machine tool comprising:

a housing mounted on the main table;

an index table supported on the housing for rotation;

a push bar extending into the housing and outwardly of the housing for movement;

the NC device being arranged to make an extra relative movement between the spindle and the main table other than the machining relative movement, so that the push bar can be pushed and moved longitudinally thereof by the extra relative movement;

transmission means received in the housing and disposed between the push bar and the index table to rotate the index table at an angle in response to the movement of the push bar whenever the push bar is moved;

a stop comprising a movable pawl supported by the housing to be moved about a support;

a movable bar connected to and supported by the push bar, the movable bar being moved integrally with the push bar by the extra relative movement to be engaged with the movable pawl so that the movable pawl can be moved to a position by the movable bar whenever the push bar is moved; and engagement means rotated at an angle in response to the rotation of the index table whenever the index table is rotated, to be engaged with the movable pawl moved to the position, so that the index table can be stopped by the movable pawl.

5. An NC machine tool including a spindle, a main table and an NC device for making a machining relative movement between the spindle and the main table, the NC machine tool comprising:

a housing mounted on the main table;

an index table supported on the housing for rotation;

a push bar extending into the housing and outwardly of the housing for movement;

the NC device being arranged to make an extra relative movement between the spindle and the main table other than the machining relative movement, so that the push bar can be pushed and moved longitudinally thereof by the extra relative movement;

transmission means received in the housing and disposed between the push bar and the index table to rotate the index table at an angle in response to the movement of the push bar whenever the push bar is moved;

a stop comprising a movable bar and an auxiliary pawl, the movable bar being supported by the housing for movement, a bracket being provided with the auxiliary pawl and fixed to the movable bar;

a movable member connected to and supported by the push bar, the movable member being moved integrally with the push bar to be engaged with the movable bar, the movable bar being moved longitudinally thereof by the movable member so that the auxiliary pawl can be moved to a position by the extra relative movement whenever the push bar is moved; and engagement means rotated at an angle in response to the rotation of the index table whenever the index table is rotated, to be engaged with the auxiliary pawl moved to the position, so that the index table can be stopped by the auxiliary pawl.

* * * * *